(12) United States Patent
Schantz et al.

(10) Patent No.: US 7,512,237 B1
(45) Date of Patent: Mar. 31, 2009

(54) ENCRYPTION FOR OPTICAL COMMUNICATIONS USING DYNAMIC SUBCARRIER MULTIPLEXING

(75) Inventors: Howard J. Schantz, Inver Grove Heights, MN (US); Rick C. Stevens, Apple Valley, MN (US); Steven H. Ernst, Apple Valley, MN (US)

(73) Assignee: Lockheed Martin Corporation, Bethesda, MD (US)

( * ) Notice: Subject to any disclaimer, the term of this patent is extended or adjusted under 35 U.S.C. 154(b) by 867 days.

(21) Appl. No.: 10/973,814

(22) Filed: Oct. 26, 2004

(51) Int. Cl.
*H04K 1/00* (2006.01)

(52) U.S. Cl. .......................... 380/256; 380/28; 380/31; 380/54; 380/255; 380/281; 380/283; 359/2; 359/107; 359/108; 359/239

(58) Field of Classification Search .................... 380/31, 380/54, 28, 255, 256, 281, 283; 359/2, 107–108, 359/239
See application file for complete search history.

(56) References Cited

U.S. PATENT DOCUMENTS

| | | | |
|---|---|---|---|
| 4,535,355 A | 8/1985 | Arn et al. | |
| 4,961,221 A | 10/1990 | Abiven | |
| 5,204,903 A | 4/1993 | Okada et al. | |
| 5,297,206 A | 3/1994 | Orton | |
| 5,708,714 A | 1/1998 | López et al. | |
| 5,712,912 A | 1/1998 | Tomko et al. | |
| 5,715,316 A | 2/1998 | Steenblik et al. | |
| 5,737,415 A * | 4/1998 | Akiyama et al. | 705/53 |
| 5,737,420 A | 4/1998 | Tomko et al. | |
| 5,793,871 A | 8/1998 | Jackson | |
| 5,864,625 A | 1/1999 | Rutledge | |
| 5,903,648 A | 5/1999 | Javidi | |
| 5,940,514 A | 8/1999 | Heanue et al. | |
| 6,501,840 B1 | 12/2002 | Saijo | |
| 6,683,955 B1 | 1/2004 | Horne | |
| 6,826,371 B1 | 11/2004 | Bauch et al. | |
| 2002/0126345 A1 * | 9/2002 | Green et al. | 359/122 |
| 2002/0181439 A1 * | 12/2002 | Orihashi et al. | 370/350 |
| 2003/0072059 A1 | 4/2003 | Thomas et al. | |
| 2003/0147533 A1 | 8/2003 | Mahlab et al. | |
| 2004/0052374 A1 * | 3/2004 | Lee et al. | 380/255 |
| 2004/0081471 A1 | 4/2004 | Lee | |
| 2004/0252832 A1 | 12/2004 | Domjan et al. | |

* cited by examiner

*Primary Examiner*—Kambiz Zand
*Assistant Examiner*—Kari L Schmidt
(74) *Attorney, Agent, or Firm*—Hamre, Schumann, Mueller & Larson, P.C.

(57) ABSTRACT

A multiplexing technique for optical communications used to create a pseudo-random communications signal in the optical domain such that only the sender and/or receiver can decode the signal. The multiplexing technique may include one or more information-bearing optical signals combined with one or more dynamic pseudo-randomly-generated optical signals to create a combined dynamic subcarrier multiplexed privacy-protected output signal. The information-bearing signal is protocol-independent and can be of mixed type, such as RF, analog, and/or digital. Only the receiver of the privacy-protected signal may decode the pseudo-random signal so as to disclose the information-bearing signal. The present invention may use dynamic subcarrier multiplexing selection based on standard digital encryption and the use of optical range time to ensure synchronization.

8 Claims, 3 Drawing Sheets

ENCRYPTION FOR OPTICAL COMMUNICATIONS USING DYNAMIC SUBCARRIER MULTIPLEXING

FIELD OF THE INVENTION

The present invention relates generally to optical data transmission systems and more particularly to encryption techniques for secure data transmission over fiber optic networks.

BACKGROUND OF THE INVENTION

The current approach to protection of signals transmitted over optical communications links is to perform an analog-to-digital conversion, apply digital encryption to the digital data stream, and convert the digital data stream back to analog. For example, U.S. Pat. No. 5,864,625 ("Methods and Apparatus for Secure Optical Communications Links") teaches a method whereby communications information is encrypted with a security key. An optical beam is then modulated with both the security key and the encrypted communications information, with different modulation schemes being used for each. The dual-modulated optical beam is then transmitted to a receiver. At the receiver, the optical beam is split into first and second optical beams. First and second demodulators are then employed to demodulate the optical beams to recover the encrypted communications information and its data rates, and the security key and its data rate. The encrypted communications information, the security key, and the data rate information are then sent to decryption and timing circuitry that decrypts the encrypted communications information to obtain the original unencrypted communications information.

Likewise, U.S. Pat. No. 5,793,871 ("Optical Encryption Interface") discloses an analog optical encryption system based on phase scrambling of two-dimensional optical images and holographic transformation for achieving large encryption keys and high encryption speed. An enciphering interface uses a spatial light modulator for converting a digital data stream into a two-dimensional optical image. The optical image is further transformed into a hologram with a random phase distribution. The hologram is converted into digital form for transmission over a shared information channel. A respective deciphering interface at a receiver reverses the encrypting process by using a phase conjugate reconstruction of the phase scrambled hologram.

However, the above listed examples both require inline digital conversion and encryption. These additional steps increase the complexity of the system and interfere with optimal use of the communications link. The analog conversion and data encryption steps introduce a severe bottleneck in an optical communications path due to the limited performance of digital electronics when compared to the extremely high bandwidth of optical fiber. It would be advantageous then to eliminate the inline digital conversion and encryption bottleneck so that unconverted analog signals can be transmitted in their native mode in a timely manner without adding additional hardware requirements for encryption/decryption.

SUMMARY OF THE INVENTION

The instant invention is a multiplexing technique for optical communications used to create a pseudo-random communications signal in the optical domain such that only the sender and/or receiver can decode the signal. The multiplexing technique may include one or more information-bearing optical signals combined with one or more dynamic pseudo-randomly-generated optical signals to create a combined, dynamic subcarrier multiplexed privacy-protected output signal. The information-bearing signal is protocol-independent and can be of mixed type, such as RF, analog, or digital. The receiver of the privacy-protected signal may decode the pseudo-random signal so as to disclose the information-bearing signal. One of the unique characteristics of the present invention is the use of dynamic subcarrier multiplexing selection based on standard digital encryption and the use of optical range time to ensure synchronization.

The present invention is a method of encryption and decryption of optical communications between a transmitter and receiver using dynamic subcarrier multiplexing. The method may include generating a first plaintext word at a transmitting end at a first time interval. The first plaintext word is encrypted to form a first ciphertext word. A first privacy signal is then generated from the first ciphertext word. Multiplexing the first privacy signal with a plurality of information bearing signals then forms a composite signal. Next the composite signal is transmitted as an optical transmission signal through a transmitting medium, such as a fiber optic line, from the transmitting end to a receiving end.

When the signal arrives at the receiving end, a second plaintext word is generated at the receiving end. The second plaintext word is identical to the first plaintext word. The second plaintext word is then encrypted to obtain a second ciphertext word identical to said first ciphertext word. Next, a second privacy signal is generated at the receiving end from the second ciphertext word, such that said second privacy signal is identical to said first privacy signal. Using the second privacy signal as a key, the user can separate the first privacy signal from the first composite signal to obtain the plurality of information bearing signals.

DETAILED DESCRIPTION OF THE INVENTION

Optical data transmission systems allow information to be transmitted in the form of light. Generally, a fiber optic cable forms a conduit through which an information bearing signal can be relayed from a transmitter to a receiver. The information bearing signal may be transmitted through the air if desired as long as some sort of a receiver is in the line of sight of the transmitter. However, fiber optic cables are preferred because they can transmit light at extremely high speed with relatively small power loss beyond the line of sight.

In a first embodiment, the present invention is a multiplexing method for secure communications over fiber optic cables. The method includes creating one or more information-bearing optical signals and then said information-bearing optical signals are combined with one or more dynamic pseudo-randomly-generated optical signals to create a combined, dynamic subcarrier multiplexed privacy-protected output signal. The pseudo-randomly-generated optical signals act as a carrier signal. The receivers of the combined, dynamic subcarrier multiplexed privacy-protected signal will need to know how to fully decode the pseudo-random signal in order to disclose the information-bearing signal. The information-bearing signal is protocol-independent and can be of mixed type, such as analog and digital. The present invention also incorporates a dynamic subcarrier multiplexing selection based on standard digital encryption and the use of optical range time to ensure synchronization.

Subcarrier multiplexing will be used to combine multiple signals to create a combined output signal. Information bearing signal $F_{info}(t)$ carries user operational information. The privacy bearing signal $F_{priv}(t)$ carries a privacy keystream generated subcarrier signal. The two signals produce an "information-private" signal that's tied back to the strength of a digital encryption algorithm. The keystream generation technique applied uses digital encryption technology to create a secure and very random digital pattern. The output of the digital encryption device can be fed into a modulator device, which produces a dynamic subcarrier. The modulation rate of the dynamic subcarrier modulator is fully randomized during each clock cycle.

Figure 1:
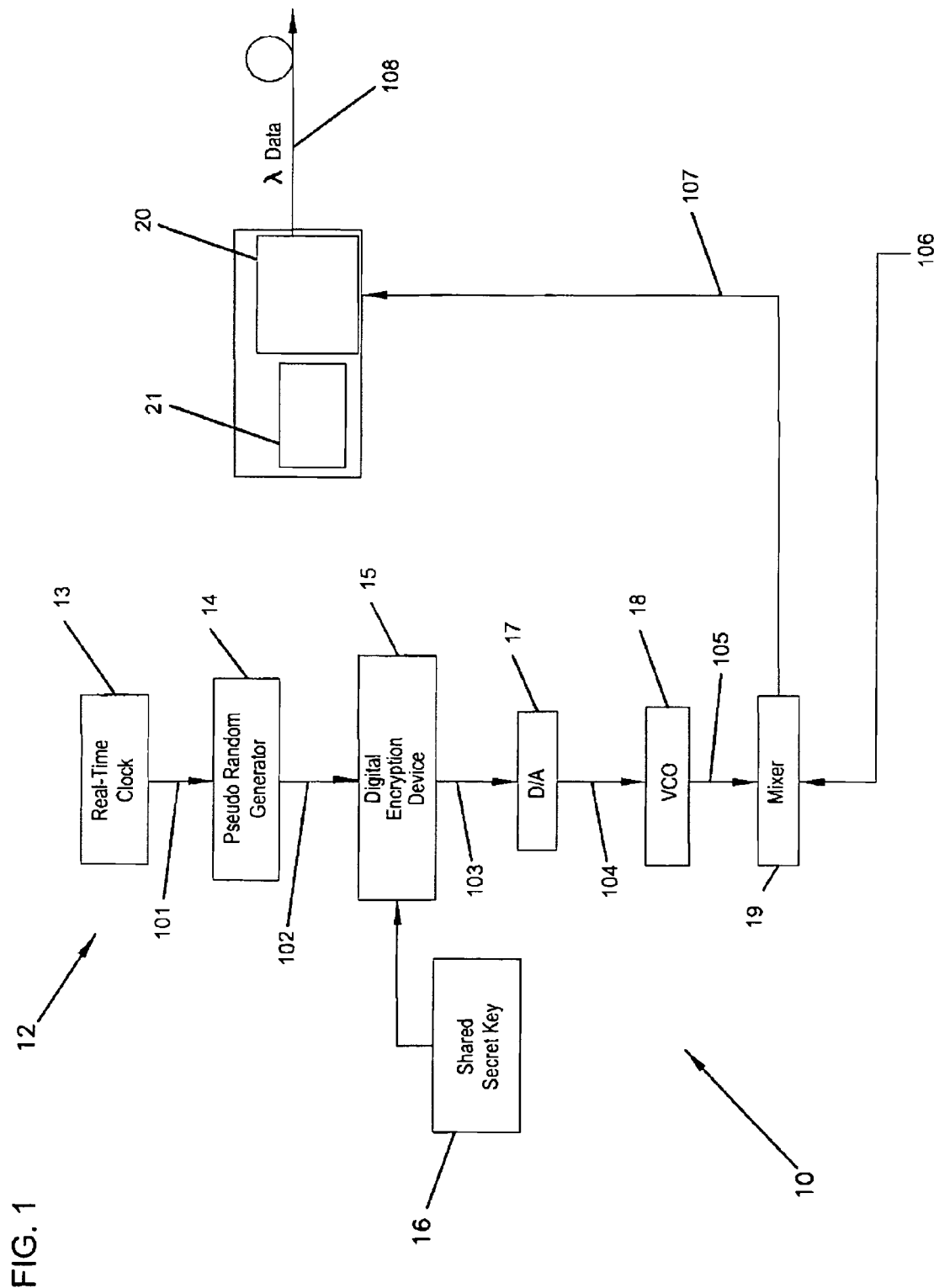
FIG. 1 is a block diagram showing the configuration of the transmitter end to the present invention.
Figure 2:
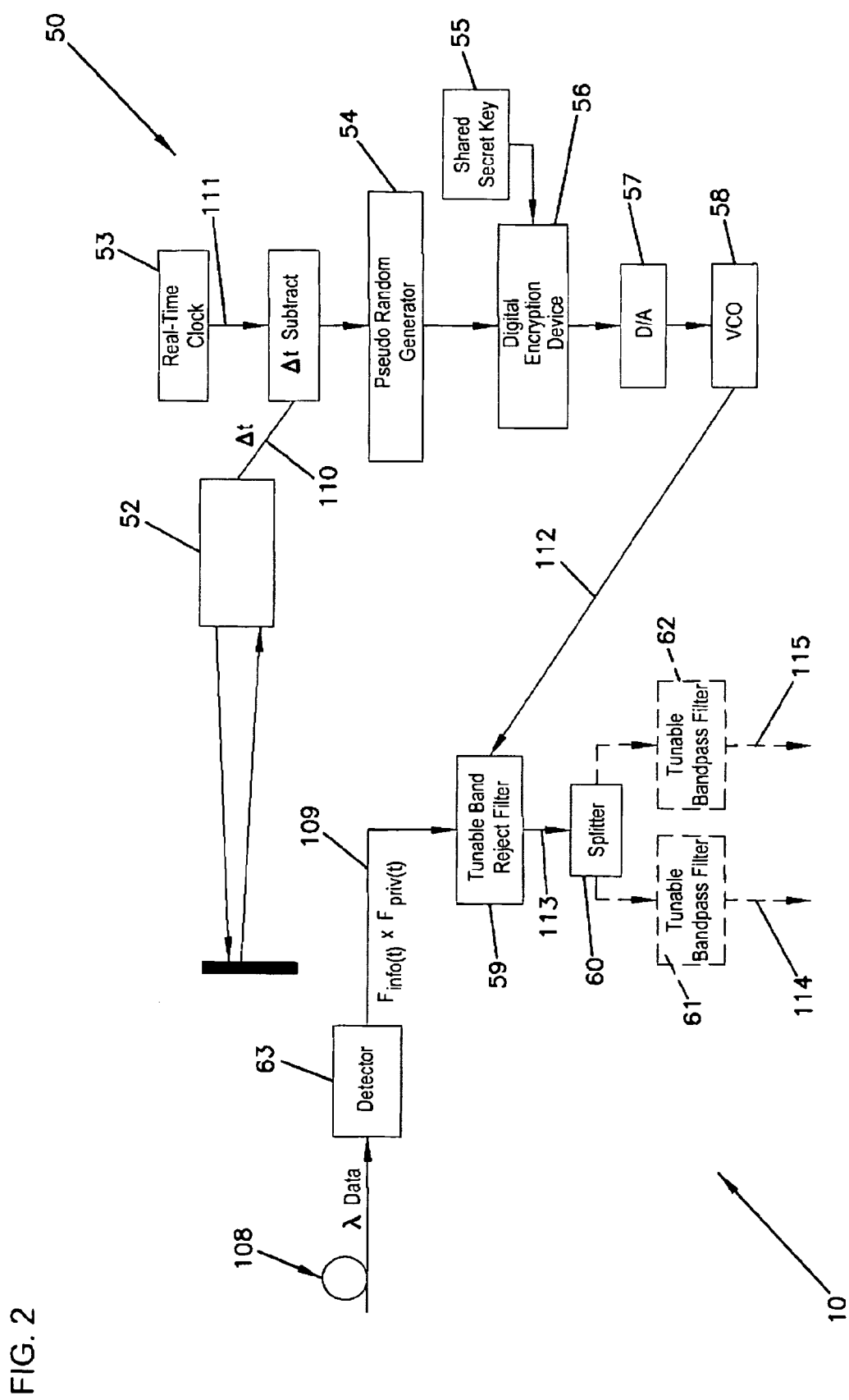
FIG. 2 is a block diagram showing the configuration of the receiving end to the present invention.
Figure 3:
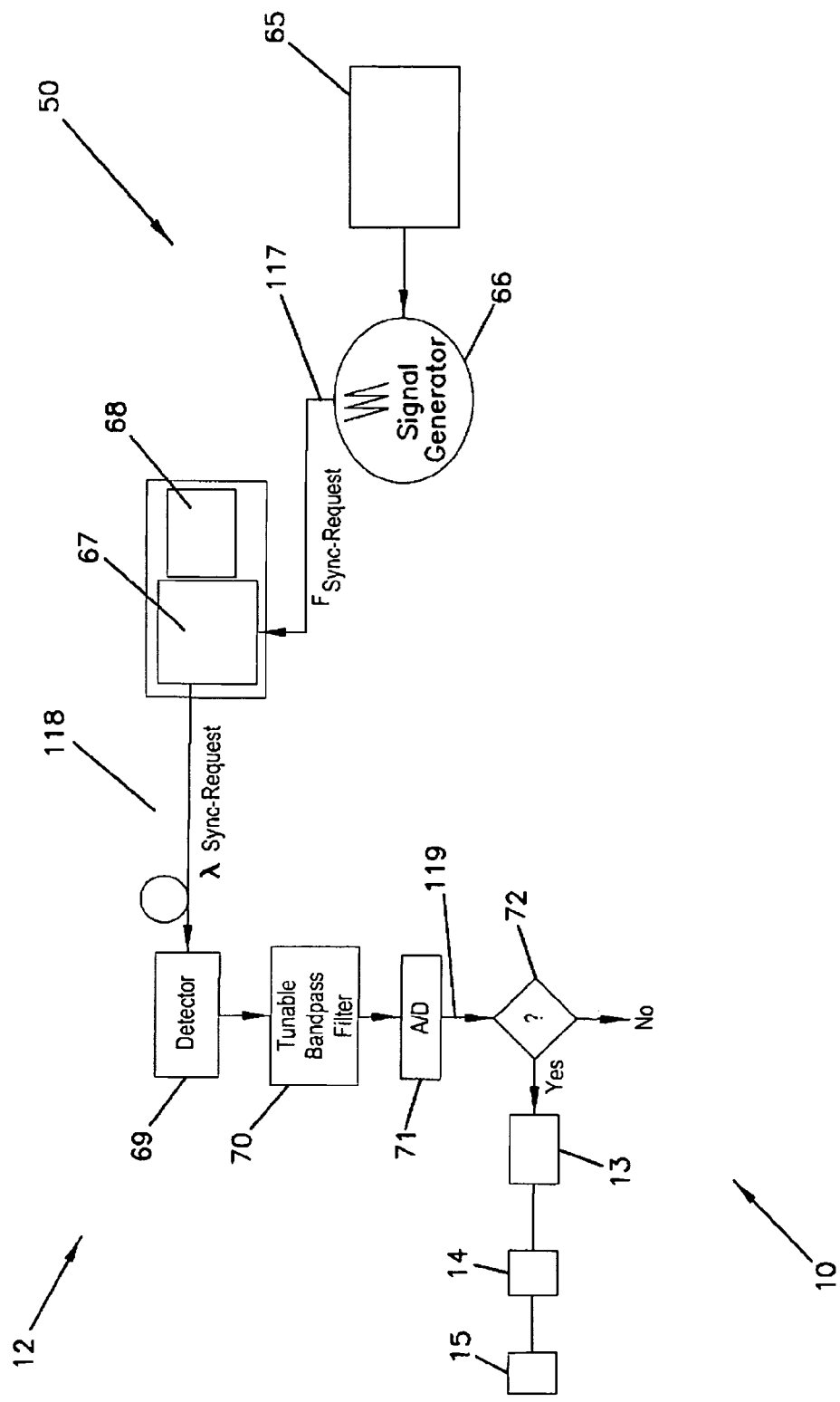
FIG. 3 is a timing diagram exemplifying information signal encryption according to the present invention.

FIGS. 1-3 show a preferred embodiment of a secure optical data transmission system 10 according to the present invention. The system 10 includes a transmitting side 12 (FIG. 1), and a receiving side 50 (FIG. 2). As shown in FIG. 1, the pseudo-random generator device 14 produces a pseudo-random plaintext data word 102 for a clock cycle 101 as produced by the real-time clock device 13. The real-time clock device 13 and pseudo-random generator device 14 are synchronized with the receive node's 50 pseudo-random generator device 54 and real-time clock device 53 as shown in FIG. 2.

The plaintext data word 102 is transformed into a ciphertext data word 103 by the digital encryption device 15. The strength and randomness of ciphertext data word 103 is based on the algorithm of the digital encryption device 15 and the strength of the shared secret encryption key 16. This invention does not depend on any specific digital encryption technology, however, it is envisioned that either cipher feedback mode (CFB) or cipher block chaining (CBC) mode may be used to implement this invention. The shared secret encryption key 16 is a shared secret pre-placed key, which was pre-distributed, presumably by a secure mechanism, to both transmit node 12 and receive node 50. This invention 10 is based on existing key generation/distribution techniques and systems. An implementation of this invention would interface with key distribution systems found in both the Department of Defense (DoD) and commercial sectors.

The digital-to-analog (D/A) device 17 converts the ciphertext data word 103 to a voltage 104 for input into the voltage controlled oscillator (YCO) 18. The VCO 18 produces a privacy signal 105 that is combined in signal mixer 19 with the information bearing signal 106. The information bearing signal 106 carries the application information generated by the application subsystem. The information bearing signal 106 will be protected when combined with the privacy signal 105. The output of signal mixer 19 is a multiplexed signal 107 for time period $t_j$ of 101. The multiplexed signal 107 is inputted into an external optical modulator 20, which is driven by the external laser 21. The resulting optical signal 108 is transmitted to the receiver node 50.

As illustrated in FIG. 2, the receive node 50 receives a multiplexed optical signal 108 from a transmit node 12. The real-time clock 53, pseudo-random generator 54, digital encryption device 56, shared secret key 55, digital-to-analog (D/A) device 57, and voltage controlled oscillator (VCO) 58 may have the same functionality as specified in the devices as described for the transmit node 12 in FIG. 1.

As shown in FIG. 2, the laser range finder 52 calculates the round-trip signal propagation delay 110 between the receive node 50 and the transmit node 12. The signal propagation delay 110 is subtracted from the output 111 of the real-time clock 53 for time period $t_j$ to synchronize with the real-time clock 13 of the transmit node 12.

The optical signal 108 is received by detector 63 to produce a multiplexed signal 109 for time period $t_j$. The multiplexed signal 109 and privacy signal 112 are inputted into the tunable band reject filter (i.e., notch filter) 59. The tunable band reject filter 59 will use the privacy signal 112 produced by the VCO 58 as the selected signal to be canceled out (i.e., reject) of the multiplexed signal 109, thereby producing the information bearing signal 113. The information bearing signal 113 could, depending on the application, consist of one or more sub-signals, which require further decomposition by splitting device 60. The information bearing signal 113 could thus be split by the application of a tunable bandpass filters 61 and 62 so that application specific sub-signals 114 and 115 are generated.

The overall responsibility for system synchronization between the transmit node 12 and receive node 50 is initiated and controlled by the receive node 50. As illustrated in FIG. 3, a periodic synchronization clock 65 controls the frequency at which system synchronization is performed. The frequency at which synchronization requests are generated is application-dependent and is expected to vary from a few seconds to a few hours. The periodic synchronization clock 65 will request signal generator 66 to generate synchronization request signal $F_{Sync-Request}$ 117 for a given duration.

The receive node 50 then generates an optical synchronization request signal 118 by application of modulator 67 and laser 68 to synchronization request signal $F_{Sync-Request}$ 117. Optical synchronization request signal 118 informs the transmit node 12 to set its digital devices to their initial state. The digital devices are the real time clock 13, pseudo-random generator 14 and encryption device 15.

The transmit node 12, upon receiving optical synchronization request signal 118 by detector 69, converts optical synchronization request signal 118 to synchronization request signal $F_{Sync-Request}$ 117. Synchronization request signal $F_{Sync-Request}$ 117 is sent through tunable bandpass filter 70 to an analog-to-digital converter 71 to create digital signal 119. A verification step 72 is performed on the synchronization request signal $F_{Sync-Request}$ 117 in the digital domain. If a $F_{Sync-Request}$ 117 is detected in digital signal 119, the transmit node 12 will reset real time clock 13, reset pseudo-random generator 14 and reset encryption device 15 before transmitting data. If a synchronization request signal $F_{Sync-Request}$ 117 is not detected, the transmit node 12 maintains the current settings for real time clock 13, pseudo-random generator 14 and encryption device 15.

In operation, a synchronization request signal $F_{Sync-Request}$ 117 is sent by receive node 50 to transmit node 12. Digital devices real time clock 13, pseudo-random generator 14 and encryption device 15 are reset if the synchronization request signal $F_{Sync-Request}$ 117 is valid. The pseudo-random generator device 14 shown in FIG. 1 produces a plaintext data word 102 for every clock cycle 101 produced by the real-time clock device 13. The plaintext data word 102 is transformed into a ciphertext data word 103 by the digital encryption device 15. The privacy signal 105 is mixed with the information signal 106 to produce a multiplexed signal 107 ($F_{info(t)} \times F_{priv(t)}$) for time period $t_j$ of 101. The process is repeated for every clock cycle 101 to create the dynamic subcarrier technique. This algorithm applies to the receive node 50, as shown in FIG. 2, so as to divide the information bearing signal from the privacy signal.

Although a preferred embodiment of the invention has been described above, a person skilled in the art appreciates that the invention may as well be applied and practices in several other forms. The invention is only limited by the claims below.

The invention claimed is:

1. A method of secure optical communication between a transmit-node operably coupled to a receiver-node, said transmit-node and said receiver-node having a shared secret key, said method comprising the steps of:
generating a transmit-side plaintext digital data word at a transmit-side current time and synchronously generating a receiver-side plaintext digital data word at a receiver-side current time, said transmit-side plaintext digital data word dependent on a first time value indicative of said transmit-side current time, said receiver-side plaintext digital data word dependent on a second time value indicative of said receiver-side current time adjusted by an optical signal transmission time;
encrypting said transmit-side plaintext digital data word to generate a transmit-side ciphertext digital data word and synchronously encrypting the receiver-side plaintext digital data word to generate a receiver-side ciphertext digital data word, said transmit-side plaintext digital data word and said receiver-side plaintext digital data word being encrypted with the shared secret key;
converting said transmit-side ciphertext digital data word into a transmit-side ciphertext analog data signal and synchronously converting the receiver-side ciphertext digital data word into a receiver-side ciphertext analog data signal;
modulating a transmit-side carrier signal having a first frequency with said transmit-side ciphertext analog data signal to output a first transmit-side frequency modulated privacy signal and synchronously modulating a receiver-side carrier signal having said first frequency with said receive-side ciphertext analog data signal to output a first receiver-side frequency modulated privacy signal;
combining a first transmit-side frequency modulated information bearing signal with said first transmit-side frequency modulated privacy signal to obtain an encrypted transmit-side frequency multiplexed electronic information bearing signal;
generating a transmit-side optical frequency modulated signal by frequency modulating a transmit-side optical carrier signal with said encrypted transmit-side frequency multiplexed electronic information bearing signal;
transmitting said transmit-side optical frequency modulated signal to said receiver-node;
detecting said transmit-side optical frequency modulated signal at said receiver-node;
converting said transmit-side optical frequency modulated signal detected at said receiver-node into said encrypted transmit-side frequency multiplexed electronic information bearing signal; and
extracting said first transmit-side frequency modulated information bearing signal from said encrypted transmit-side frequency multiplexed electronic information bearing signal by using said first receiver-side frequency modulated privacy signal to cancel out the first transmit-side frequency modulated privacy signal.

2. The method of claim 1 further including synchronizing the transmit-node and the receiver-node, said synchronizing including determining a transmission time for an optical signal to propagate from said transmit-node to said receiver-node.

3. The method of claim 2 wherein the step of determining said transmission time comprises the steps of:
using a laser range finder to determine an optical distance between said transmit-node and said receive-node;
calculating a transmission time as a time required for an optical signal to traverse said optical distance; and
subtracting the transmission time from the receiver-side current time.

4. The method of claim 2 further including synchronizing a transmit-side real time clock with a receiver-side real time clock, comprises the steps of:
transmitting an optical synchronization-request signal from said receiver-node to said transmit-node, said optical synchronization-request signal indicative of a receiver-side local transmission time at which said synchronization-request signal was transmitted from said receiver-node;
receiving said optical synchronization-request signal at said transmit-node at a transmit-side local arrival time;
offsetting said transmit-side local arrival time for said transmission time of said optical synchronization-request signal from said receiver-node to said transmit-node to obtain a time indicative of a receiver-side current time; and
adjusting said transmit-side real time clock so that a transmit-side current time is substantially coincident with said receiver-side current time.

5. The method of claim 4 wherein transmitting the optical synchronization-request signal is periodically repeated to compare said transmit-side reference time value to said receive-side local current time to obtain a measure of an out-of-synchronization condition.

6. The method of claim 1 wherein said step of encrypting said transmit-side plaintext digital data word and said receiver-side plaintext digital data word uses a cipher block chaining mode for encryption.

7. The method of claim 1 wherein said step of encrypting said transmit-side plaintext digital data word and said receiver-side plaintext digital data word uses a cipher feedback mode for encryption.

8. The method of claim 1 wherein said step of extracting said first transmit-side frequency modulated electronic information bearing signal from said encrypted transmit-side frequency multiplexed electronic information bearing signal includes the steps of:
inputting said encrypted transmit-side frequency multiplexed electronic information bearing signal into a tunable band reject filter together with said first receiver-side frequency modulated privacy signal to output said first transmit-side frequency modulated information bearing signal; and
inputting said first transmit-side frequency modulated information bearing signal into a plurality of tunable bandpass filters to decompose said first transmit-side frequency modulated information bearing signal into a plurality of subcomponent information signals.

* * * * *